(12) United States Patent
Haruna et al.

(10) Patent No.: US 8,213,342 B2
(45) Date of Patent: Jul. 3, 2012

(54) FLAGGING/INDICATING USER INFORMATION IN CONFERENCE EVENT PACKAGE

(75) Inventors: Adamu Haruna, Tampere (FI); Miguel A. Garcia-Martin, Helsinki (FI)

(73) Assignee: Nokia Corporation, Espoo (FI)

( * ) Notice: Subject to any disclaimer, the term of this patent is extended or adjusted under 35 U.S.C. 154(b) by 1415 days.

(21) Appl. No.: 11/544,966

(22) Filed: Oct. 6, 2006

(65) Prior Publication Data

US 2008/0084832 A1     Apr. 10, 2008

(51) Int. Cl.
*H04L 12/16* (2006.01)
*H04Q 11/00* (2006.01)

(52) U.S. Cl. .................. 370/261; 379/202.01; 709/204; 709/227

(58) Field of Classification Search .................. None
See application file for complete search history.

(56) References Cited

U.S. PATENT DOCUMENTS

| 6,192,395 | B1 * | 2/2001 | Lerner et al. | 709/204 |
|---|---|---|---|---|
| 2003/0061484 | A1 | 3/2003 | Noble | |
| 2005/0131989 | A1 * | 6/2005 | Beckmann et al. | 709/201 |
| 2006/0064502 | A1 * | 3/2006 | Nagarajayya | 709/237 |
| 2007/0091830 | A1 * | 4/2007 | Coulas et al. | 370/260 |
| 2008/0084832 | A1 * | 4/2008 | Haruna et al. | 370/260 |

OTHER PUBLICATIONS

J. Rosenberg et al., "SIP: Session Initiation Protocol," RFC 3261, Jun. 2002, The Internet Society.*
J. Rosenberg et al., "A Session Initiation Protocol (SIP) Event Package for Conference State," draft-ietf-sipping-conference-packet-12, Jul. 1, 2005, The Internet Society.*
Rosenberg, A Framework for conferencing with the session initiation protocol (SIP). Network Working Group, Request for Comments: 4353, Category: Informational, Cisco Systems, Feb. 2006, p. 1-29.
Peterson, A Privacy mechanism for the session initiation protocol (SIP). Network Working Group, Request for Comments: 3323, Category: Standards Track, Neustar, Nov. 2002, p. 1-22.
International Search Report for PCT/IB2007/053319.
Rosenberg et al., SIP: Session Initiation Protocol, Network Working Group, Request for Comments: 3261, Obsoletes: 2543, Category: Standards Track, The Internet Society, Jun. 2002, p. 1-252.
Rosenberg et al., SIP: A Session Initiation Protocol SIP) Event Package for Conference Site, Network Working Group, Request for Comments: 4575, Category: Standards Track, The Internet Society, Aug. 2006, p. 1-45.
"Session Initiation Protocol (SIP)—Specific Event Notification", A. B. Roach, RFC 3265, Jun. 2002, 38 pgs.

* cited by examiner

*Primary Examiner* — Jae Y Lee
(74) *Attorney, Agent, or Firm* — Harrington & Smith

(57) ABSTRACT

A system and method for indicating user information in a conference event package. An extension is added to the current conference event package in various embodiments of the present invention. This extension adds a new attribute to user information, including an indicator that explicitly indicates to a user that certain information is the user's own information. Therefore, when a user desiring anonymity joins a conference and then subscribes to the conference event package in order to obtain the roster, the conference lists one of the participants with an indicator that indicates to the user that this particular participant is the user.

16 Claims, 5 Drawing Sheets

FLAGGING/INDICATING USER INFORMATION IN CONFERENCE EVENT PACKAGE

FIELD OF THE INVENTION

The present invention relates generally to multimedia conferencing. More particularly, the present invention relates to the flagging or indicating of a user's information during a multimedia conference.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Open Mobile Alliance (OMA) currently specifies an Instant Messaging service, namely OMA SIP/SIMPLE IM 1.0. The service is based on an Internet Engineering Task Force (IETF)-specified Session Initiation Protocol (SIP)/SIMPLE protocol such as (Session Initiation Protocol) SIP, Message Session Relay Protocol (MSRP) and Extensible Markup Language (XML) Configuration Application Protocol (XCAP).

The SIP events framework defines general mechanisms for subscribing to and receiving notifications of events within SIP networks. The SIP events framework is defined in the IETF Request for Comments (RFC) 3265, which can be found at www.ietf.org/rfc/rfc3265.txt and is incorporated herein by reference in its entirety. SIP introduces a package which is a specific "instantiation" of the events framework for a well-defined set of events. As used herein, a "SIP event package" is used for tightly coupled conferences. The SIP event package can be used by a conference notification service as outlined in the SIP conferencing framework.

In multimedia conferencing, participants of the conference use SIP to subscribe to the conference event package and to obtain information about, among other things, the list of participants, as well as their properties in the conference and the state of other components of the conference. This is discussed in detail in the IETF RFC 4575, which can be found at www.ietf.org/rfc/rfc4575.txt and is incorporated herein by reference in its entirety. The body of notification in this conference event package is a XML document. The document describes the state of the conference, the list of participants in the conference, their status, information, media types, etc.

A user becomes a participant of a conference by first sending a SIP INVITE request to the Uniform Resource Identifier (URI) that has been allocated to the conference. The conference server answers with a 200 OK response to accept the new participant. The new participant then subscribes to the conference event package in order to obtain the roster and other associated conference data. At about the same time, the other participants who are subscribed to the conference are also notified about the new participant. This is accomplished with an updated notification carrying the XML conference document.

Conference servers typically provide an anonymization function at the user's disposal. In many situations, a participant may wish to remain anonymous to the other conference participants, i.e., he or she may not want his or her SIP URI to be revealed to the other participants. This is achieved with the anonymization function of the conference, which replaces the participant's real SIP URI with an anonymous SIP URI such as sip:user@anonymous.invalid. This is the current practice according the IETF RFC 3261, which can be found at www.ietf.org/rfc/rfc3261.txt and is incorporated herein by reference in its entirety. The anonymization function in the conference therefore allows the conference application to authenticate users and know the real SIP URI of a user, without having to reveal this information to the rest of the participants in the conference.

In conventional conference scenarios, a problem arises when several anonymous users join the same conference. In particular, when there are several anonymous participants, each anonymous participant is currently unable to identify the anonymous URI that the conference server has selected for him or her. For example, it is helpful to envision a scenario where, in a given conference, there are 50 participants, and 10 of these participants have chosen to remain anonymous. In this situation, it is helpful to assume that the anonymous URIs allocated by the conference server contain some random number, for example, sip:user39@anonymous.invalid, sip:user1932@anonymous.invalid, sip:user2723@anonymous.invalid, and so on. At some point in time, a new participant joins the conference, thereby becoming the $11^{th}$ anonymous participant out of a total of 51 participants. This new participant also subscribes to the conference event package and obtains a list of participants, which includes also his own anonymous URI: sip:user4563@anonymous.invalid. The problem is that this new participant is not able to distinguish himself from the rest of the other anonymous participants.

In light of the above, it is particularly desirable for the relevant software (the SIP User Agent) in any participant's device to be able to distinguish his or her own SIP URI from others, for example, to display private messages that are received through the conference server. It is desirable for the user interface (UI) in the SIP application to provide a differentiation of these private messages that are sent by the other participants to the allocated anonymous URI. Therefore, the SIP User Agent (UA) needs to know which URI, among all of the anonymous URIs, is the anonymous URI that is allocated to the user.

SUMMARY OF THE INVENTION

The present invention provides a system and method for flagging or indicating user information in a conference event package. According to various embodiments, an extension is added to the current conference event package. This extension adds a new attribute to user information, including a flag or other indicator that explicitly indicates to a user that certain information is the user's own information. Therefore, when a user desiring anonymity joins a conference and then subscribes to the conference event package in order to obtain the roster, the conference server lists one of the participants with an indicator that indicates to the user "this is yourself." This allows the recipient of the roster to identify his or her own URI and adjacent information out of the rest of the URIs belonging to other participants.

With the various embodiments of the present invention, a client's association with specific user information in a conference event package is more explicitly indicated by the conference server than in conventional arrangements. In addition, from an administrator's point of view, the administrator has more flexibility in modifying clients' input information due to internal policy considerations and can explicitly indicate such changes to the client(s), thereby permitting the client(s) to subsequently use the information in the conference. Still further, in the case of several anonymous URIs in a conference, where an administrator modifies the users to make them unique (as required by RFC 4575), the administrator can explicitly indicate to each client its own information to be used in the conference.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

The present invention provides a system and method for flagging or indicating user information in a conference event package. According to various embodiments, an extension is added to the XML document transmitted as part of the current conference event package. This extension adds a new attribute to user information, including a flag or other indicator that explicitly indicates to a user that certain information is the user's own information. Therefore, when a user desiring anonymity joins a conference and then subscribes to the conference event package in order to obtain the roster, one of the participants will be listed with an indicator that indicates to the user "this is yourself" when the user views his or her user interface.

Figure 1:
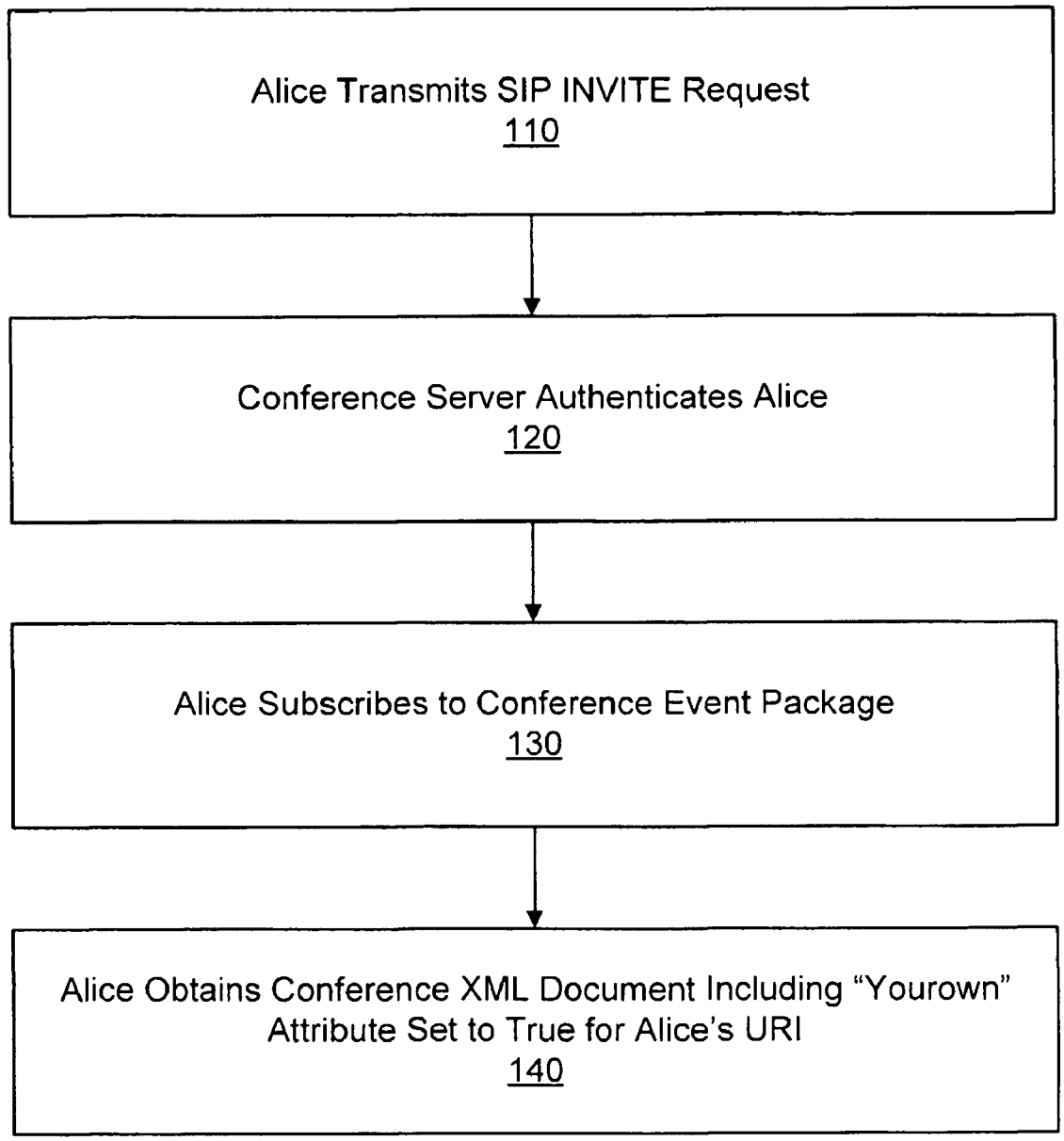
FIG. 1 is a flow chart showing a process by which a user joins a conference in accordance with an embodiment of the present invention, where the user's identity is made public to other conference participants.

A first example scenario in accordance with various embodiments of the present invention is depicted in FIG. 1. As depicted in FIG. 1, "Alice" joins a conference at 110 by transmitting a SIP INVITE request to the URI that has been allocated to the conference. At 120, the conference server authenticates Alice with a 200 OK response, so that the conference server knows who Alice is and which URI is her SIP URI. At no time during this process does Alice indicate any anonymity requirement. At 130, Alice subscribes to a conference event package and, at 140, obtains a conference XML document. The conference XML document, a portion of which is listed below, contains a list of participants, including Alice's URI, which serves as a participant identifier in this scenario. In the portion of the XML document below, there is a new "yourown" XML attribute with a value set to "true" in the vicinity of Alice's information. This flag indicates to Alice's device the URI to which she is known to the rest of the participants.

```
<conference-state>
  <user-count>33</user-count>
</conference-state>
<users>
  <user entity="sip:bob@example.com" state="full">
    <display-text>Bob Hoskins</display-text>
  </user>
  ...
  <user entity="sip:alice@example.com" state="full" yourown="true">
    <display-text>Alice</display-text>
  </user>
</users>
```

At about the same time, an updated conference XML document is transmitted to the other participants of the conference. Each participant's XML document will include a different "yourown" XML attribute marked as "true," thereby indicating to each person his or her own "identity" in the conference.

Figure 2:
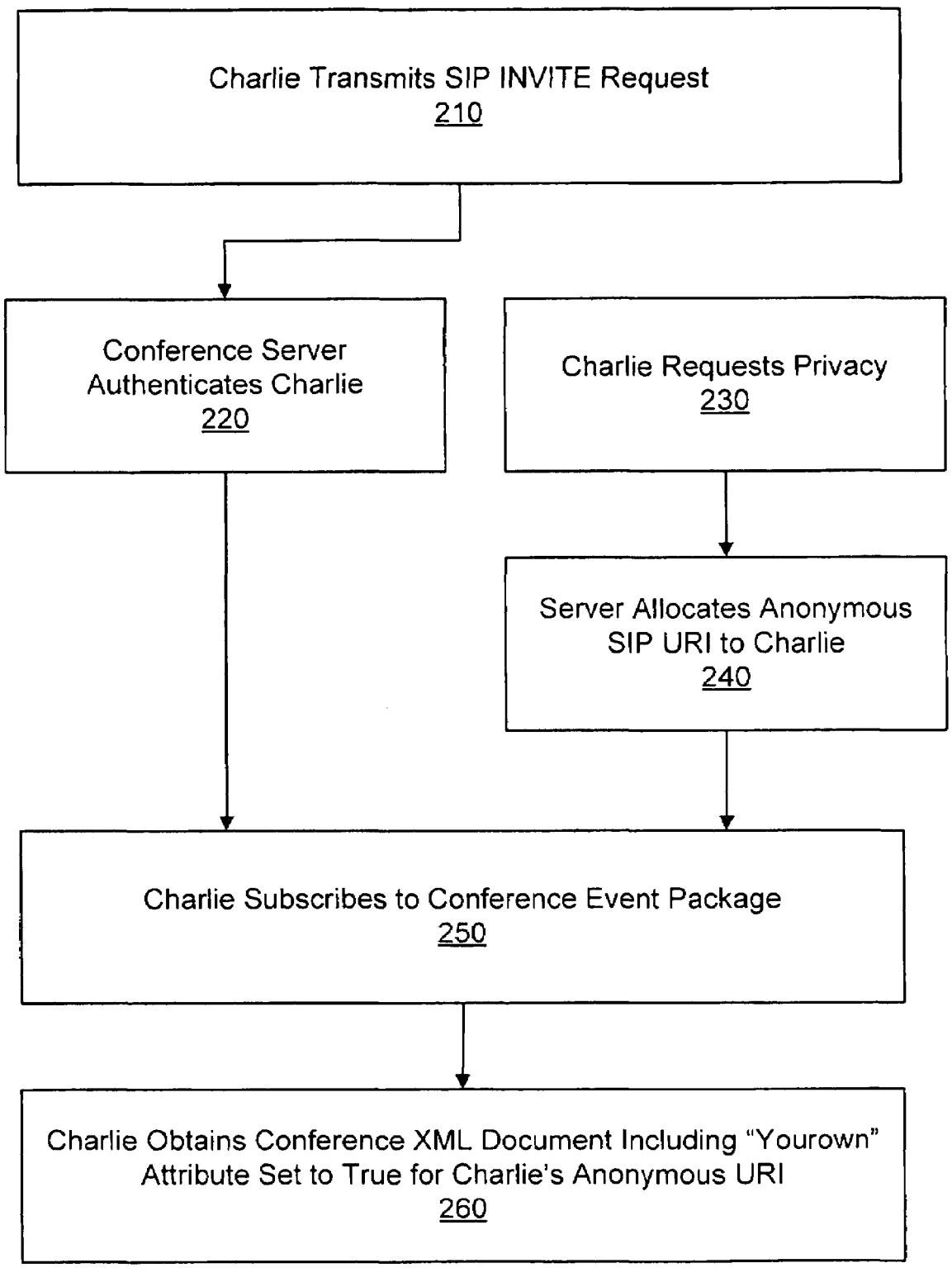
FIG. 2 is a flow chart showing a process by which a user joins a conference in accordance with an embodiment of the present invention, where the user's identity is kept anonymous.

A second example scenario in accordance with various embodiments of the present invention is depicted in FIG. 2. As shown in FIG. 2, "Charlie" joins a conference at 210 by transmitting a SIP INVITE request to the URI that is allocated to the conference. At 220, the conference server authenticates Charlie with a 200 OK response, so that the conference server knows who Charlie is and which URI is his SIP URI. However, Charlie also indicates at 230 that he wants privacy via having the conference server not disclose his SIP URI to the rest of the participants. This indication can be accomplished via a variety of messages and mechanisms known in the art. At 240 and in response to this indication, the conference server allocates an anonymous participant identifier, in the form of an anonymous SIP URI, to Charlie. Charlie then proceeds to subscribe to the conference event package at 250 and obtains a conference XML document at 260. The conference XML document includes a list of participants. A relevant portion of the XML document is depicted below. The document includes a "yourown" XML attribute with a value set to "true" for Charlie's anonymized URI. This indicates to Charlie the URI to which he is known to the rest of the participants. In other words, Charlie can observe which of the anonymous URIs is his own.

```
<conference-state>
  <user-count>33</user-count>
</conference-state>
<users>
  <user entity="sip:bob@example.com" state="full">
    <display-text>Bob Hoskins</display-text>
  </user>
  <user entity="sip:alice@example.com" state="full">
    <display-text>Alice</display-text>
  </user>
  ...
  <user entity="sip:anon34@anonymous.invalid" state="full"
  yourown="true">
    <display-text>Anonymous</display-text>
  </user>
</users>
```

The following is a description of an XML schema that can extend the current XML schema specified in RFC 4575 to add an "yourown" XML attribute. Other XML schemas are also possible.

```xml
<?xml version="1.0" encoding="UTF-8"?>

<xs:schema targetNamespace="urn:params:xml:ns:ownflag"
    xmlns="urn:params:xml:ns:ownflag"
    xmlns:xs="http://www.w3.org/2001/XMLSchema"
    elementFormDefault="qualified"
    attributeFormDefault="unqualified">
  <xs:annotation>
    <xs:documentation xml:lang="en">
       Adds a flag to a user of the conference event
       package to indicate own user information.
    </xs:documentation>
  </xs:annotation>
  <xs:import namespace="urn:ietf:params:xml:ns:conference-info"
       schemaLocation="urn:ietf:params:xml:schema:conference-info"/>
  <xs:attribute name="yourown" type="xs:boolean" default="false" />
</xs:schema>
```

Figure 3:
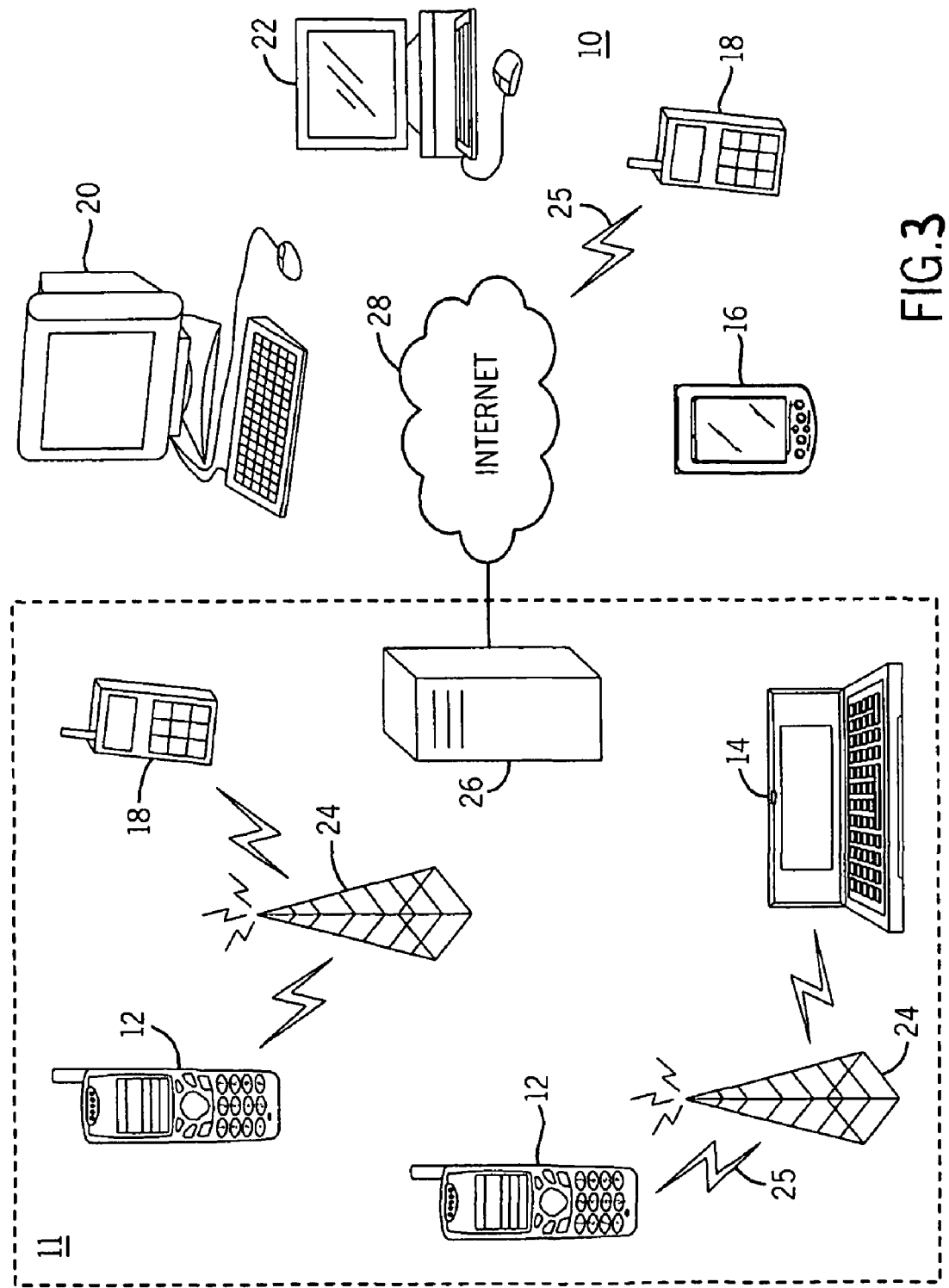
FIG. 3 is an overview diagram of a system within which the present invention may be implemented.

FIG. 3 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service, Bluetooth, IEEE 802.11, etc. A communication device may communicate using various media including, but not limited to, radio, infrared, laser, cable connection, and the like.

Figure 4:
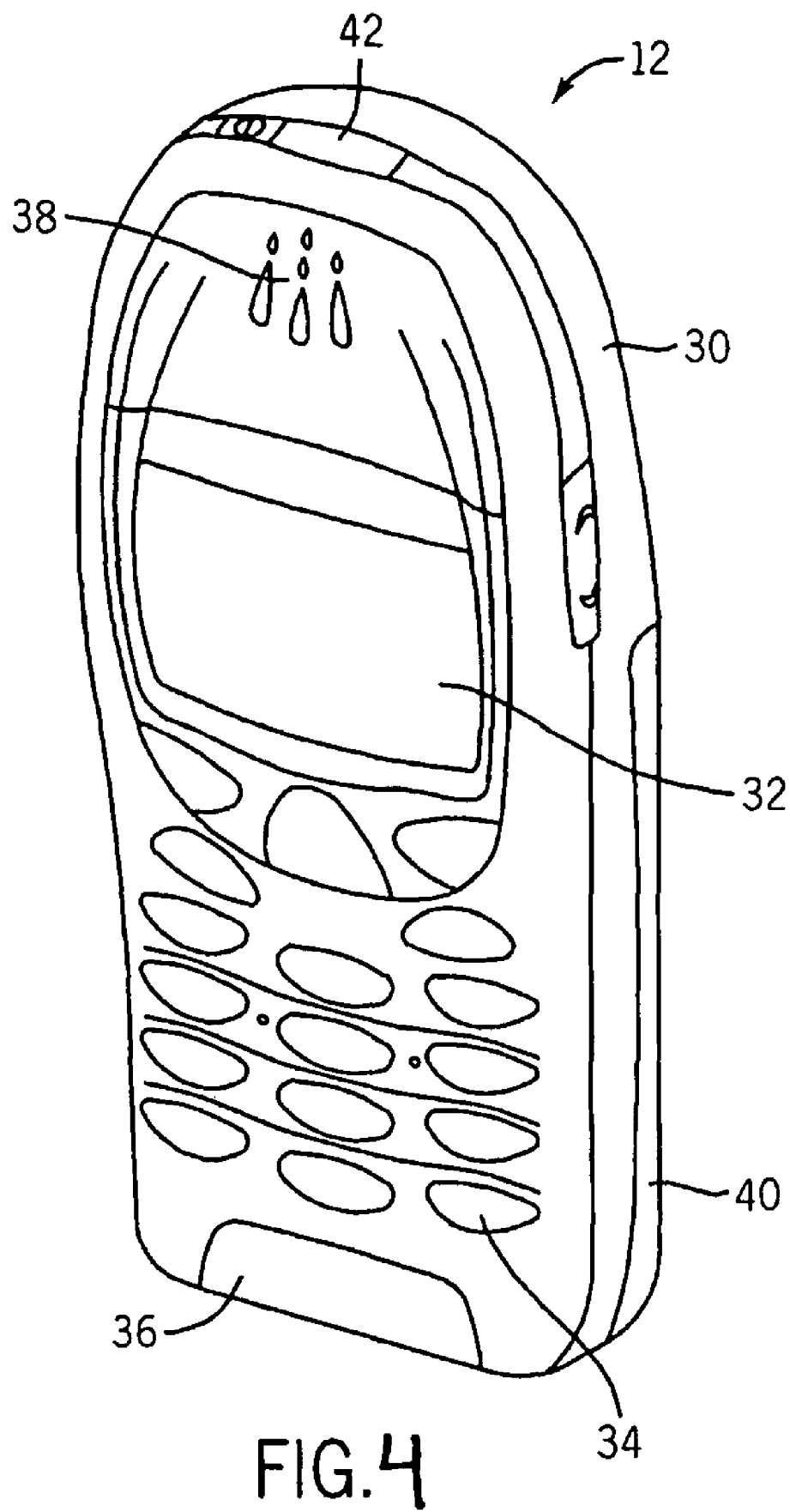
FIG. 4 is a perspective view of a mobile telephone that can be used in the implementation of the present invention.
Figure 5:
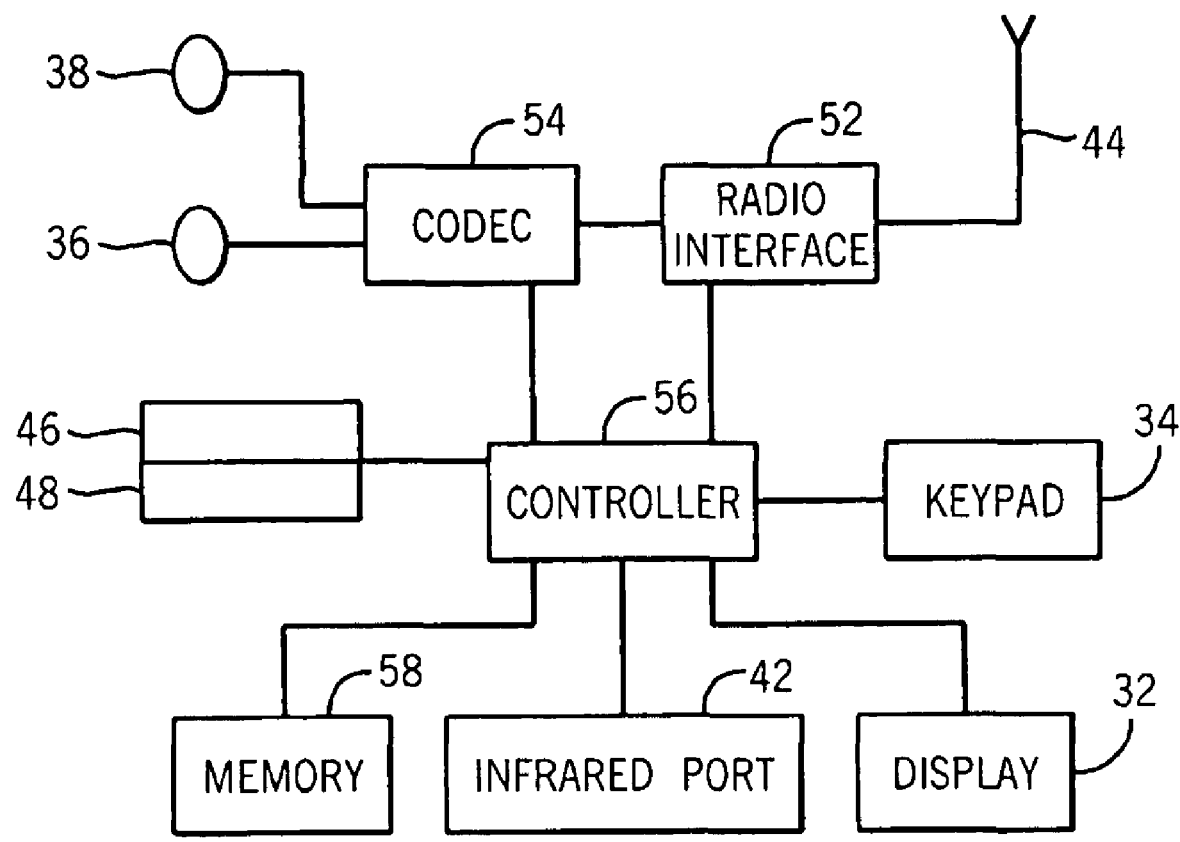
FIG. 5 is a schematic representation of the circuitry of the mobile telephone of FIG. 4.

FIGS. 4 and 5 show one representative mobile telephone 12 within which the present invention may be implemented. It should be understood, however, that the present invention is not intended to be limited to one particular type of mobile telephone 12 or other electronic device. The mobile telephone 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

Below are provided numbered clauses that are further illustrative of the exemplary embodiments of the invention.

Clause 1. A method of providing information to a user in a conference of the user's identity, comprising: authenticating a user for joining a conference; and in response to the user subscribing to a conference event package for the conference, providing a list of conference participant identifiers to the user, wherein the list includes an indication of which of the listed participant identifiers corresponds to the user.

Clause 2. The method of clause 1, wherein the list of conference participant identifiers is contained within a conference XML document.

Clause 3. The method of clause 1, wherein the indication comprises a flag that is set to "true" to indicate the participant identifier for the user.

Clause 4. The method of clause 1, further comprising: receiving a request from the user to remain anonymous during the conference; and in response to the request, assigning an anonymous participant identifier for the user, and wherein the user's anonymous participant identifier is included in the provided list along with the associated indication.

Clause 5. The method of clause 4, wherein the anonymous participant identifier comprises a randomly assigned Session Initiation Protocol (SIP) Uniform Resource Indicator (URI).

Clause 6. A computer program product, embodied in a computer-readable medium, for providing information to a user in a conference of the user's identity, comprising: computer code for authenticating a user for joining a conference; and computer code for, in response to the user subscribing to a conference event package for the conference, providing a list of conference participant identifiers to the user, wherein the list includes an indication of which of the listed participant identifiers corresponds to the user.

Clause 7. An apparatus, comprising: a processor; and a memory unit communicatively connected to the processor and including: computer code for authenticating a user for joining a conference and computer code for, in response to the user subscribing to a conference event package for the conference, providing a list of conference participant identifiers to the user, wherein the list includes an indication of which of the listed participant identifiers corresponds to the user.

Clause 8. The apparatus of clause 7, wherein the list of conference participant identifiers is contained within a conference XML document.

Clause 9. The apparatus of clause 7, wherein the indication comprises a flag that is set to "true" to indicate the participant identifier for the user.

Clause 10. The apparatus of clause 7, wherein the memory unit further comprises: computer code for receiving a request from the user to remain anonymous during the conference; and computer code for, in response to the request, assigning an anonymous participant identifier for the user, and wherein the user's anonymous participant identifier is included in the provided list along with the associated indication.

Clause 11. The apparatus of clause 10, wherein the anonymous participant identifier comprises a randomly assigned Session Initiation Protocol (SIP) Uniform Resource Indicator (URI).

Clause 12. A method for self-identifying a user within a conference, comprising: subscribing to a conference event package for a particular conference; in response to the subscription, receiving a list of conference participant identifiers from a conference server, the list of conference participant identifiers representing the participants in the conference; and locating an indication associated with one of the listed participant identifiers, the indication identifying the listed participant identifier that corresponds to the user.

Clause 13. The method of clause 12, wherein the list of conference participant identifiers is contained within a conference XML document sent from the conference server.

Clause 14. The method of clause 12, wherein the indication comprises a flag that is set to "true" to indicate the participant identifier for the user.

Clause 15. The method of clause 12, further comprising sending a request to the server that the user remain anonymous during the conference, wherein, in response to the request, the list of conference participant identifiers includes an anonymous participant identifier for the user along with the associated indication.

Clause 16. The method of clause 15, wherein the anonymous participant identifier comprises a randomly assigned Session Initiation Protocol (SIP) Uniform Resource Indicator (URI).

Clause 17. A computer program product, embodied in a computer-readable medium, for self-identifying a user within a conference, comprising: computer code for subscribing to a conference event package for a particular conference; computer code for, in response to the subscription, receiving a list of conference participant identifiers from a conference server, the list of conference participant identifiers representing the participants in the conference; and computer code for locating an indication associated with one of the listed participant identifiers, the indication identifying the listed participant identifier that corresponds to the user.

Clause 18. An apparatus, comprising: a processor; and a memory unit communicatively connected to the processor and including: computer code for subscribing to a conference event package for a particular conference; computer code for, in response to the subscription, receiving a list of conference participant identifiers from a conference server, the list of conference participant identifiers representing the participants in the conference; and computer code for locating an indication associated with one of the listed participant identifiers, the indication identifying the listed participant identifier that corresponds to the user.

Clause 19. The apparatus of clause 18, wherein the list of conference participant identifiers is contained within a conference XML document sent from the conference server.

Clause 20. The apparatus of clause 18, wherein the indication comprises a flag that is set to "true" to indicate the participant identifier for the user.

Clause 21. The apparatus of clause 18, wherein the memory unit further comprises computer code for sending a request to the server that the user remain anonymous during the conference, wherein, in response to the request, the list of conference participant identifiers includes an anonymous participant identifier for the user along with the associated indication.

Clause 22. The apparatus of clause 21, wherein the anonymous participant identifier comprises a randomly assigned Session Initiation Protocol (SIP) Uniform Resource Indicator (URI).

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
receiving, by an apparatus, a request from a user device to subscribe to a conference as an anonymous participant;
in response to the request, assigning, by an apparatus, an anonymous participant identifier to the user device, and;
sending, from the apparatus to the user device, a message comprising a plurality of anonymous participant identifiers including the anonymous participant identifier assigned to the user device, wherein the message further comprises a flag set to "true" along with the anonymous participant identifier, wherein the flag is configured to indicate to the user device that the anonymous participant identifier is assigned to the user device, wherein the user device is configured to identify, based on the flag, which of the plurality of anonymous participant identifiers is its own, wherein the anonymous participant identifier of the user device is for use while the user device is known to other participants in the conference, wherein the other participants receive the plurality of anonymous participant identifiers without the flag set to "true" for the anonymous participant identifier of the user device.

2. The method of claim 1, wherein the message comprises an extensible markup language document having a list of conference participant identifiers and wherein the extensible markup language document comprises the anonymous participant identifier assigned to the user device and the flag.

3. The method of claim 1, wherein the anonymous participant identifier comprises a randomly assigned session initiation protocol uniform resource indicator.

4. A non-transitory computer-readable medium storing program code that, when executed by a computer, results in operations comprising:
receiving a request from a user device to subscribe to a conference as an anonymous participant;

in response to the request, assigning an anonymous participant identifier to the user device, and sending, to the user device, a message comprising a plurality of anonymous participant identifiers including the anonymous participant identifier assigned to the user device, wherein the message further comprises a flag set to "true" along with the anonymous participant identifier, wherein the flag is configured to indicate to the user device that the anonymous participant identifier is assigned to the user device, wherein the user device is configured to identify, based on the flag, which of the plurality of anonymous participant identifiers is its own, wherein the anonymous participant identifier of the user device is for use while the user device is known to other participants in the conference, wherein the other participants receive the plurality of anonymous participant identifiers without the flag set to "true" for the anonymous participant identifier of the user device.

5. The non-transitory computer-readable medium of claim 4, wherein the message comprises an extensible markup language document having a list of conference participant identifiers and wherein the extensible markup language document comprises the anonymous participant identifier assigned to the user device and the flag.

6. An apparatus comprising:
at least one processor; and
at least one memory including computer program code for one or more programs,
the at least one memory and the computer program code configured to, with the at least one processor, cause the apparatus to perform at least the following:
receiving a request from a user device to subscribe to a conference as an anonymous participant;
in response to the request, assigning an anonymous participant identifier to the user device, and
sending, to the user device, a message comprising a plurality of anonymous participant identifiers including the anonymous participant identifier assigned to the user device, wherein the message further comprises a flag set to "true" along with the anonymous participant identifier, where the flag is configured to indicate to the user device that the anonymous participant identifier is assigned to the user device, wherein the user device is configured to identify, based on the flag, which of the plurality of anonymous participant identifiers is its own, wherein the anonymous participant identifier of the user device is for use while the user device is known to other participants in the conference, wherein the other participants receive the plurality of anonymous participant identifiers without the flag set to "true" for the anonymous participant identifier of the user device.

7. The apparatus of claim 6, wherein the message comprises an extensible markup language document having a list of conference participant identifiers and wherein the extensible markup language document comprises the anonymous participant identifier assigned to the user device and the flag.

8. The apparatus of claim 6, wherein the anonymous participant identifier comprises a randomly assigned session initiation protocol uniform resource indicator.

9. A method comprising:
sending a request, from a user device to a server, that the user device remain anonymous during a conference; and
in response to the request, receiving, by the user device from the server, a message comprising a plurality of anonymous participant identifiers including an anonymous participant identifier assigned to the user device, wherein the message further comprises a flag set to "true" along with the anonymous participant identifier, wherein the flag is configured to indicate to the user device that the anonymous participant identifier is assigned to the user device, wherein the user device is configured to identify, based on the flag, which of the plurality of anonymous participant identifiers is its own, wherein the anonymous participant identifier of the user device is for use while the user device is known to other participants in the conference, wherein the other participants receive the plurality of anonymous participant identifiers without the flag set to "true" for the anonymous participant identifier of the user device.

10. The method of claim 9, wherein the message comprises an extensible markup language document having a list of conference participant identifiers and wherein the extensible markup language document comprises the anonymous participant identifier assigned to the user device and the flag.

11. The method of claim 9, wherein the anonymous participant identifier comprises a randomly assigned session initiation protocol uniform resource indicator.

12. A non-transitory computer-readable medium storing program code that, when executed by a user device, results in operations comprising:
sending a request, to a server, that the user device remain anonymous during a conference; and
in response to the request, receiving, from the server, a message comprising a plurality of anonymous participant identifiers including an anonymous participant identifier assigned to the user device, wherein the message further comprises a flag set to "true" along with the anonymous participant identifier, wherein the flag is configured to indicate to the user device that the anonymous participant identifier is assigned to the user device, wherein the user device is configured to identify, based on the flag, which of the plurality of anonymous participant identifiers is its own, wherein the anonymous participant identifier of the user device is for use while the user device is known to other participants in the conference, wherein the other participants receive the plurality of anonymous participant identifiers without the flag being set to "true" for the anonymous participant identifier of the user device.

13. The non-transitory computer-readable medium of claim 12, wherein the message comprises an extensible markup language document having a list of conference participant identifiers and wherein the extensible markup language document comprises the anonymous participant identifier assigned to the user device and the flag.

14. An apparatus comprising:
at least one processor; and
at least one memory including computer program code for one or more programs, the at least one memory and the computer program code configured to, with the at least one processor, cause the apparatus to perform at least the following:
sending a request, to a server that the apparatus remain anonymous during a conference; and
in response to the request, receiving, from the server, a message comprising a plurality of anonymous participant identifiers including an anonymous participant identifier assigned to the apparatus, wherein the message further comprises a flag set to "true" along with the anonymous participant identifier, wherein the flag is configured to indicate to the apparatus that the anonymous participant identifier is assigned to the apparatus, wherein the apparatus is configured to identify, based on the flag, which of the plurality of anonymous participant identifiers is its own, wherein the anonymous participant identifier of the user device is for use while the apparatus is known to other participants in the conference, wherein the other participants receive the plurality of anonymous participant identifiers without the flag set to "true" for the anonymous participant identifier of the apparatus.

15. The apparatus of claim 14, wherein the message comprises an extensible markup language document having a list of conference participant identifiers and wherein the extensible markup language document comprises the anonymous participant identifier assigned to the apparatus and the flag.

16. The apparatus of claim 14, wherein the anonymous participant identifier comprises a randomly assigned session initiation protocol uniform resource indicator.

\* \* \* \* \*